United States Patent [19]
Tanaka et al.

[11] 3,984,866
[45] Oct. 5, 1976

[54] COLOR TELEVISION CAMERA

[75] Inventors: Hirofumi Tanaka; Hiromi Okumura, both of Uji, Japan

[73] Assignee: Matsushita Electric Industrial Co., Ltd., Japan

[22] Filed: Mar. 12, 1975

[21] Appl. No.: 557,900

[30] Foreign Application Priority Data
Mar. 19, 1974 Japan.... ........................ 49-32129

[52] U.S. Cl. .................................. 358/44; 358/47
[51] Int. Cl.² .......................................... H04N 9/07
[58] Field of Search .................. 358/41, 44, 45, 46, 358/47; 350/162 SF

[56] References Cited
UNITED STATES PATENTS

| | | | |
|---|---|---|---|
| 3,560,637 | 2/1971 | Takeuchi et al. | 358/44 |
| 3,726,991 | 4/1973 | Takeumura et al. | 358/55 |
| 3,840,696 | 10/1974 | Green | 358/45 |

Primary Examiner—John C. Martin
Attorney, Agent, or Firm—Burgess, Ryan and Wayne

[57] ABSTRACT

A single-tube color television camera is disclosed wherein the optical image of a subject is split into three color images by an optical color filter consisting of first vertical stripes for transmitting therethrough all of the three primary color components, second vertical stripes for transmitting therethrough only two of the primary color components, and third vertical stripes for transmitting therethrough only one of the two primary color components, the first, second and third sets of stripes being arrayed cyclically; the three color images projected on the target of a television camera tube are scanned by the electron beams in the direction at right angles to the stripes of the optical color filter; and the predetermined components of the color video signal outputs from the television camera tube are added or substracted so that the three primary color video signals may be derived.

5 Claims, 6 Drawing Figures

COLOR TELEVISION CAMERA

BACKGROUND OF THE INVENTION

The present invention relates to generally a color television camera, and more particularly a single-tube color television camera.

Of various types of color television cameras, there has been known the so-called single-tube color television cameras of the type in which the color components split by a stripe type optical color filter are converted into electrical signals by a single camera tube in a time division manner. Such a color television camera has the advantages that it is compact in size, light in weight and inexpensive to manufacture, but its resolution is unsatisfactory compared with the three-tube television cameras. In general, the conventional optical filters include a large number of black stripes as a means for generating the reference signal used for the color signal separation. Therefore, the sensitivity as well as the resolution are further decreased. To overcome these problems, there has been devised and demonstrated a color television camera tube of the type in which two comb-shaped electrodes are formed as means for generating the reference signal for the color signal separation, but the construction of the electrodes of the television camera tube and its associated circuits is very complex, resulting in an increased cost.

To overcome the above undesirable features, there has been devised and demonstrated a frequency separation type color television camera of the type disclosed in Japanese Pat. Publication No. 8699/1970. This camera eliminates the use of means for generating the reference signal for color signal separation. It uses the combination of a first color splitting filter of the type consisting of a large number of transparent stripes and yellow stripes which are vertically and alternately arrayed, and a second color splitting filter of the type consisting of a large number of transparent stripes and cyan stripes which are transversely and alternately arrayed. The color signal components derived by passing the output from the camera tube through a preamplifier and a band-pass filter are added to and substracted from the signal obtained by delaying the color signal components by 1H; that is, one horizontal scanning time (about 6µsec.) and the outputs from the adder and substractor are detected, so that the red and blue primary color signals may be obtained.

The fundamental frequencies of the color signal components are very high and of the order of few MHz. Therefore, from the standpoint of linearity of the deflection system and the electrical stability of the 1H delay circuit, various difficulties are encountered in practice and circuits with complex construction are required in order to delay the color signal component by 1H; so as to generate the delayed signal which is out of phase by 180° from the original signal.

SUMMARY OF THE INVENTION

In view of the above, the present invention provides a single-tube television camera in which the optical image of a subject is split in color by an optical color filter of the type consisting of a plurality of stripes for transmitting therethrough all of the three primary color components, a plurality of stripes for transmitting therethrough only two of the three primary color components, and a plurality of stripes for transmitting therethrough only one primary color component of the two color components, the three types of stripes being cyclically arrayed vertically; the split color images projected on the target of the television camera tube are scanned in a direction at right angles to the stripes of the color filter; and the predetermined components of the output from the camera tube are added and substracted so that the three primary color video signals may be derived.

One of the objects of the present invention is therefore to provide a single-tube color television camera simple in construction and highly reliable and dependable in operation.

BRIEF DESCRIPTION OF THE DRAWINGS

FIGS. 1-(B), 1-(C) and 1-(D) show the waveforms of the signals obtained by the television camera from the light images transmitted through respective stripes of the optical filter shown in FIG. 1-(A);

DESCRIPTION OF THE PREFERRED EMBODIMENT

Figure 1:
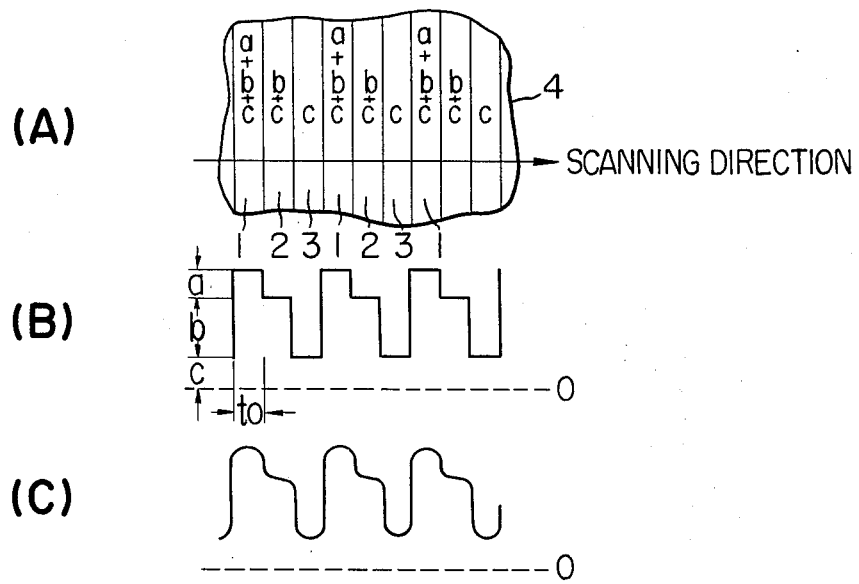
FIG. 1-(A) is a fragmentary schematic view of an optical filter used in a television camera in accordance with the present invention.

First, the underlying principle of the present invention will be described. In order to split the light image of the scene being televised into three color images, a single-tube color television camera in accordance with the present invention uses a stripe type optical color filter 4 which, as shown in FIG. 1-(A), consists of a plurality of first substantially transparent stripes 1 for transmitting therethrough all of the primary color components $a$, $b$ and $c$; a plurality of second cyan color filter stripes 2 for transmitting therethrough only the color components $b$ and $c$; and a plurality of third blue color filter stripes 3 for transmitting therethrough only one of the two color components transmitted by the cyan stripes 2. The first, second and third stripes 1, 2 and 3 have the same width, and are vertically arrayed in the order named cyclically from left to right as shown in FIG. 1-(A).

Figure 2:
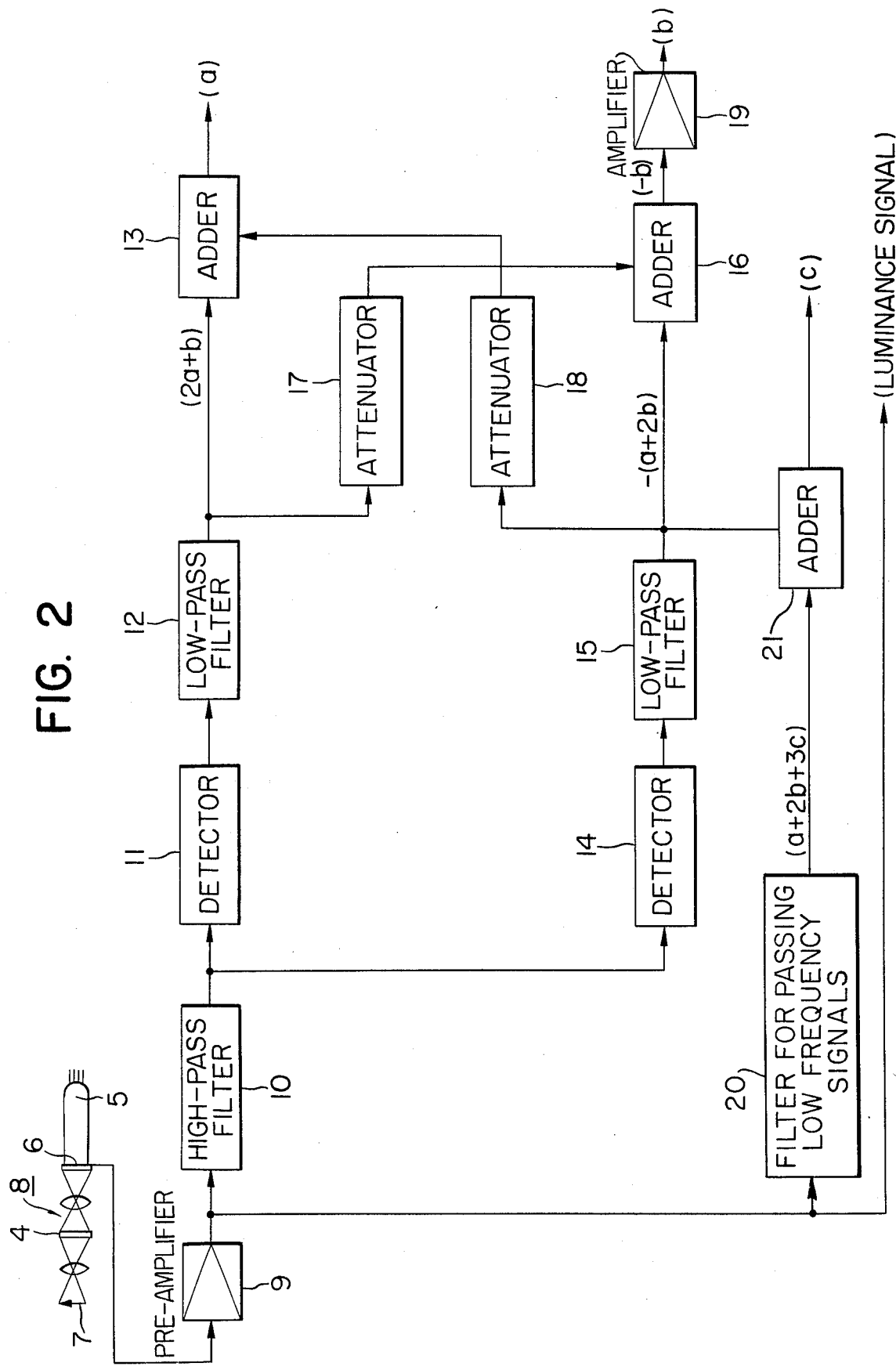
FIG. 2 is a block diagram of one preferred embodiment of a color television camera in accordance with the present invention.

As shown in FIG. 2, within an optical system 8, the optical color filter 4 is interposed between a subject 7 and a target 6 of a television camera tube 5. Alternatively, the optical color filter 4 may be attached to the inner or outer side surface of the target of the television camera tube 5. In either case, the optical image of the subject 7 is split into three color images and projected on the target 6 of the camera tube 5.

In the television camera tube 5, the target 6 is scanned by the electron beam in a direction at right angles to the stripes 1, 2 and 3 of the optical color filter 4, so that color video signals with waveforms shown in FIG. 1-(B) may be derived from a pre-amplifier 9. When the optical image of the subject 7 has the red, green and blue components in equal proportion, the quantity of light transmitted through the first stripe 1 is greater than that transmitted through the second stripe 2, and the quantity of light transmitted through the second stripe 2 is greater than that transmitted through the third stripe 3. Therefore, the levels of the color video signals are stepwise as shown in FIG. 1-(B). However, because of non-ideal optical properties of the optical system 8 and the television camera tube 5, the reproduction of desired harmonics cannot be attained in practice. Therefore color video signals with the waveforms as shown in FIG. 1-(C) are derived in practice, but the deviation of the waveforms of the video signals obtained from the ideal waveforms is very small and is negligible in practice. Therefore, in the description of the preferred embodiment of the present invention, it is assumed that ideal color splitting could be accomplished and that the color video signals with exactly ideal waveforms could be derived.

The output from the pre-amplifier 8 passes through a high-pass filter 10 so that the color video signals with waveforms as shown in FIG. 1-(D) may be derived. It should be noted that the color video signals shown in FIG. 1-(D) do not include the pedestal portion; i. e. the color video signal representing the color component $c$ shown in FIG. 1-(B). The high-pass filter 10 must have such frequency characteristics that the color video signal components $a$ and $b$ may not be degraded. Since these components $a$ and $b$ do not include the higher-order harmonics, instead of the high-pass filter 10, a band-pass filter may be used. From the standpoint of noise elimination and manufacturing cost, the band-pass filter is more advantageous than the high-pass filter. The most essential requirement for the band-pass filter is that it transmit therethrough not only the fundamental waves of the components $a$ and $b$ but also at least the second harmonics thereof.

The output from the filter 10 provides the waveform as shown in FIG. 1-(D), in which the positive and negative portions (hatched portions) above and below the ground or mean level 0 have the same area. Let $x$ represent the difference between the mean level O and P which is the upper limit of the color component $b$ or the lower limit of the color component $a$; $A_1$ the difference between the mean level 0 and the upper limit Q of the color component $a$; $A_2$ the difference between the mean level 0 and the lower limit R of the color component $b$; and $t_o$ a time required to scan each of the first, second and third stripes 1, 2 and 3. Then, the following relations hold:

$$A_2 t_o = x \, t_o + A_1 t_o$$

Therefore $$A_2 = x + A_1 \tag{1}$$

$$A_1 = a + x \tag{2}$$

$$A_2 = b - x \tag{3}$$

From Eqs. (1), (2) and (3), $A_1$ and $A_2$ may be expressed in terms of $a$ and $b$ as follows:

$$A_1 = a + x \tag{4}$$

$$A_2 = b - x \tag{5}$$

Therefore, the two color components $a$ and $b$ may be separated from each other by addition and substraction of $A_1$ and $A_2$.

In order to obtain the color compoent $c$, the color video signals from the pre-amplifier pass through a low pass filter as will be described in detail hereinafter so that a level $A_3$ may be obtained in the form of $$A_3 = a + 2b + 3c \tag{6}$$

From $A_2$ and $A_3$, the color component $c$ may be separated.

Next referring to FIGS. 2 and 3, the preferred embodiment of a color television camera in accordance with the present invention will be described.

The output from a detector 11 which detects the positive peak value of the output from the filter 10 is applied to a low-pass filter 12 so that the low frequency signal $(2a + b)$ may be derived and applied to an adder 13. The output from a detector 14 which detects the negative peak value of the output from the filter 10 is applied to a low-pass filter 15 so that the low frequency signal $(a + ab)$ may be derived and applied to an adder 16.

The signal $(2a + b)$ which is attenuated to one half by an attenuator 17 is applied to the adder 16 while the signal $-(a + 2b)$ which is also attenuated to one half by an attenuator 18 is applied to the adder 13. Therefore, the adder 13 produces a signal corresponding to the color component $a$ while an inverted amplifier 19 connected to the adder 16 generates the signal corresponding to the color component $b$.

The output from the pre-amplifier 9 is also applied to a filter for passing low frequency signals 20, and the output $(a + 2b + 3c)$ from the filter for passing low frequency signals 20 is added to the signal $-(a + 2b)$ in an adder 21 so that a signal corresponding to the color component $c$ may be obtained.

Figure 3:
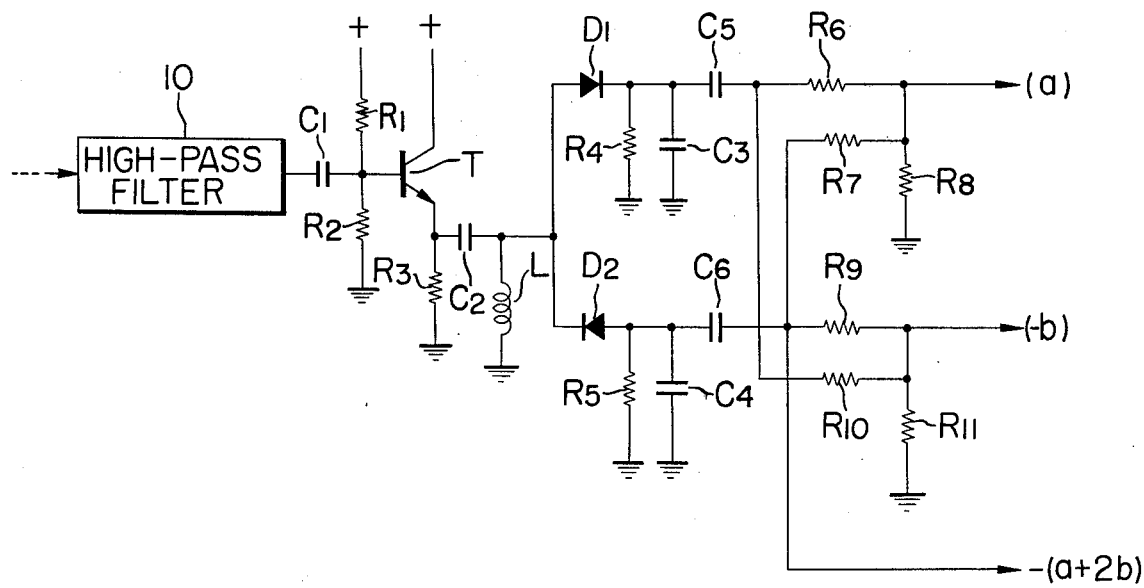
FIG. 3 is a detailed circuit diagram thereof.

FIG. 3 is a detailed circuit diagram of the instant embodiment. The output (with DC component removed) from the filter 10 is applied to an emitter-follower type amplifier consisting of a capacitor $C_1$, resistors $R_1$, $r_2$ and $R_3$, and a transistor T, so that the output is converted into a signal with impedance sufficiently low for detection. The output from the amplifier is applied through a coupling capacitor $C_2$ to the detectors. A choke coil L which exhibits high impedance to the color signals but exhibits a low DC resistance is inserted in order to ensure the positive operation of detector diodes $D_1$ and $D_2$, which corresponds to the detectors 11 and 14, respectively, shown in FIG. 2. Resistors $R_4$ and $R_5$ are load resistors, and capacitors $C_3$ and $C_4$ are inserted not only for deriving the peak values but also for functioning as the second filters 12 and 15. However, if the desired filteration cannot be attained by these capacitors $C_3$ and $C_4$, suitable lowpass filters must be inserted.

The adder 13 consists of three resistors $R_6$, $R_7$ and $R_8$. The resistor $R_7$ has a value twice as large as the resistor $R_6$ so that it functions as the attenuator 18. In like manner, the adder 16 consists of three resistors $R_9$, $R_{10}$ and $R_{11}$, and the resistor $R_{10}$ functions as the attenuator 17.

As described above, according to the present invention, the main function of the color television camera for splitting the optical image may be accomplished in a simple manner by passing the color signal components derived from the high-pass, or band-pass filter through the detectors and arithematic operation means such as adders, and the black stripes of the optical screen which are provided for deriving the reference signal may be eliminated. Furthermore, high image resolution may be attained, the distortion may be minimized; and satisfactory color reproducibility may be ensured.

What is claimed is:

1. A color television camera comprising
  a. a television camera tube;
  b. a color splitting means comprising a plurality of first stripes for transmitting therethrough all of the primary color components, a plurality of second stripes for transmitting therethrough two of said primary color components, and a plurality of third stripes for transmitting therethrough only one of said two primary color components, said first, second and third stripes being cyclically arrayed;

c. means for projecting the optical image of a subject upon the target of said television camera tube through said color splitting means; and d. means for deriving the repetitively occuring components of the color video signal from the output of said television camera tube comprising a high-pass filter connected to the output of said television camera tube, a first separating means for detecting the positive peaks of the high-pass filter output, a second separating means for detecting the negative peaks of the high-pass filter output, adder means for summing said detected negative and positive peaks from the first and second separating means to derive primary color video components of said camera tube signal, and means connecting said adder means to said first and second separating means.

2. A color television camera as set forth in claim 1, wherein said means for connecting said adder means to said first and second separating means comprises separate attenuators connected to each of said first and second separating means for attenuating each peak signal by ½, and wherein said adder means comprises a first adder having a first input connected to the unattenuated output of said first separating means, and having a second input connected to the output of the attenuator that is connected to the second separating means, and a second adder having a first input connected to the unattenuated output of said second separating means and having a second input connected to the output of the attenuator that is connected to said first separating means.

3. A color television camera as set forth in claim 2, further comprising a filter for passing low frequency signals connected to said camera tube output, a third adder, means connecting a first input of said third adder to said camera tubes through said filter for passing low frequency signals, and means connecting a second input of said third adder to said second separating means, the output of said third adder providing a further color component of said television camera.

4. A television camera as set forth in claim 2, wherein said means connecting said adders to said first and second separating means comprises a separate low pass filter connecting the output of said first and second separating means to said adders and to said attenuators.

5. A television camera as set forth in claim 3, wherein said means for connecting said adders to said first and second separating means further comprises a separate low pass filter connecting the output of said first and second separating means to said adders and to said attenuators.

* * * * *

UNITED STATES PATENT OFFICE
CERTIFICATE OF CORRECTION

Patent No. 3,984,866             Dated  October 5, 1976

Inventor(s)   Hirofumi Tanaka, et al

It is certified that error appears in the above-identified patent and that said Letters Patent are hereby corrected as shown below:

Column 1, line 46:  Change "6 μsec." to --64 μsec.--.

Column 3, line 11:  Change "8" to --9--.

Column 4, line 31:  Change "$r_2$" to --$R_2$--.

Signed and Sealed this

Twenty-second Day of February 1977

[SEAL]

Attest:

RUTH C. MASON
*Attesting Officer*

C. MARSHALL DANN
*Commissioner of Patents and Trademarks*